United States Patent [19]

Johnstone

[11] 4,143,902
[45] Mar. 13, 1979

[54] UTILITY UNIT FOR CAMPER VEHICLES

[76] Inventor: Thomas V. Johnstone, 13 Parkwood Crescent, Ottawa, Canada, K1B 3J4

[21] Appl. No.: 789,045

[22] Filed: Apr. 20, 1977

[51] Int. Cl.² .............................................. B60P 3/34
[52] U.S. Cl. .............................. 296/167; 292/256.71
[58] Field of Search ...................... 296/23 R, 23 MC; 292/256.71, 256, 260; 248/226, 229, 359

[56] References Cited

U.S. PATENT DOCUMENTS

| | | | |
|---|---|---|---|
| 2,867,471 | 1/1959 | Coon | 296/23 R |
| 3,692,351 | 9/1972 | Christopher et al. | 296/23 R |
| 3,730,580 | 5/1973 | Page | 296/23 R |
| 3,888,539 | 6/1975 | Niessner | 296/23 MC X |
| 3,911,999 | 10/1975 | Iller | 296/23 R |

Primary Examiner—Joseph F. Peters, Jr.
Assistant Examiner—Gene A. Church
Attorney, Agent, or Firm—Arthur A. March

[57] ABSTRACT

A modular utility unit is provided which is intended to replace a door on a vehicle. The modular utility unit includes: a utility-containing and appliance-containing unit having a facade, a base, a top, sides and an exterior surrogate door panel; utility appliances disposed within the modular utility unit; and clamps disposed within the modular utility unit in proximity to the surrogate door panel. When the door of the vehicle is removed, the clamps cooperate with a door frame of the vehicle for securing the utility unit within the vehicle. Releasing the clamps enables removal of the utility unit from the vehicle, and the door of the vehicle may then be replaced.

10 Claims, 4 Drawing Figures

UTILITY UNIT FOR CAMPER VEHICLES

BACKGROUND OF THE INVENTION (i) Field of the Invention

This invention relates to a modular utility unit for camper vehicles; and in particular to such a modular utility unit which is adapted to be selectively removably incorporated into a van-type vehicle by attachment through existing loading doors.

(ii) Description of the Prior Art

There are numerous camper vehicles now available on the market, from the very expensive motor homes, to many simple tent trailer units. One of the major disadvantages of these various types of camper vehicles is the lack of versatility of the unit, namely the fact that due to the functional requirements of a camper, the vehicle cannot readily be used for other purposes. One of the more popular vehicles on which campers are constructed is the van, which is very often outfitted by the owner with the appropriate camping equipment.

(iii) Difficulties of the Prior Art

However, since camping is seldom a year-round activity, the owners of van-based campers would find it extremely advantageous if the vehicle could be quickly reconverted to its van mode. There is, therefore, a need for equipment which will be used to convert easily a van-type of vehicle into a camper van, and vice versa. In particular there is a need to provide easy installation of the main cooking, heating, ventilating, refrigerating and water supply components.

SUMMARY OF THE INVENTION (i) Aims of the Invention

Accordingly, it is a broad object of the present invention to provide a modular utility unit for a camper vehicle which can be easily installed and removed.

Another object of the present invention is to provide such a modular utility unit which may be mounted in a van type of vehicle using existing loading doorways to accomodate the unit.

A further object of the present invention is to provide such a modular utility unit for a van which is adapted to conform to the configurations of a van doorway by replacing the door with such a modular utility unit containing the desired appliances.

Another object of the present invention is to provide means for securing such a modular utility unit to a van doorway, such securing means including an adjustable clamping which allows the modular utility unit to be secured to van doorways of various configurations.

(ii) Statement of Invention

By this invention, a modular unit is provided which is intended to replace a door on a vehicle, the utility unit comprising: a modular, appliance-containing unit having a facade, a base, sides a top, sides and a rear surrogate door panel; utility appliances disposed within the modular utility unit; and clamping means disposed within the modular utility unit in proximity to the surrogate door panel, the clamping means cooperating with a door frame of the vehicle when a door mounted in the frame is removed, whereby, when the clamping means is engaged, it secures the modular utility unit within the vehicle with the surrogate door panel replacing the former door, and, when the clamping means is disengaged, it enables removal of the modular utility unit from the vehicle and replacement with the original door.

This invention also provides a clamping means comprising a hollow housing having a slot on one side thereof and provided with securement means on the housing; a rotatable screw member mounted longitudinally therein, adjusting means secured to one end of the rotatable screw member; a travelling rail member disposed along the screw member, and a pivotable arm supported by the travelling rail member, the pivotable arm being adapted to protrude from the slot and being adapted to pivot as a result of rotation of the rotatable screw member.

(iii) Other Features of the Invention

In one feature the modular utility unit includes a range, a refrigerator, a heater, a gas light, a supply of fuel, water heater, water hook-up hoses and electrical outlets.

In another feature, the surrogate door panel is provided with venting outlets for the appliances, and with supply plugs for the water and electrical outlets.

In a further feature of this invention, the clamping means is provided by a hollow rectangular parellelpiped housing and having a slot on one side thereof, provided with securement plates transversely positioned at opposite ends thereof; a screw member mounted longitudinally therein, one end of the screw member being freely rotatably mounted to one end of the housing, and the other end of the screw member being provided with an attached adjusting means; and a travelling rail member disposed along the screw member; and a pivotable arm supported by the rail member, the pivotable arm being adapted to protrude from the slot pivot as a result of rotation of an adjusting nut of the adjusting means.

In a feature of this invention, the clamping means is mounted within the modular utility unit to provide the clamping means.

BRIEF DESCRIPTION OF THE DRAWINGS

In the accompanying drawings.

Figure 1:
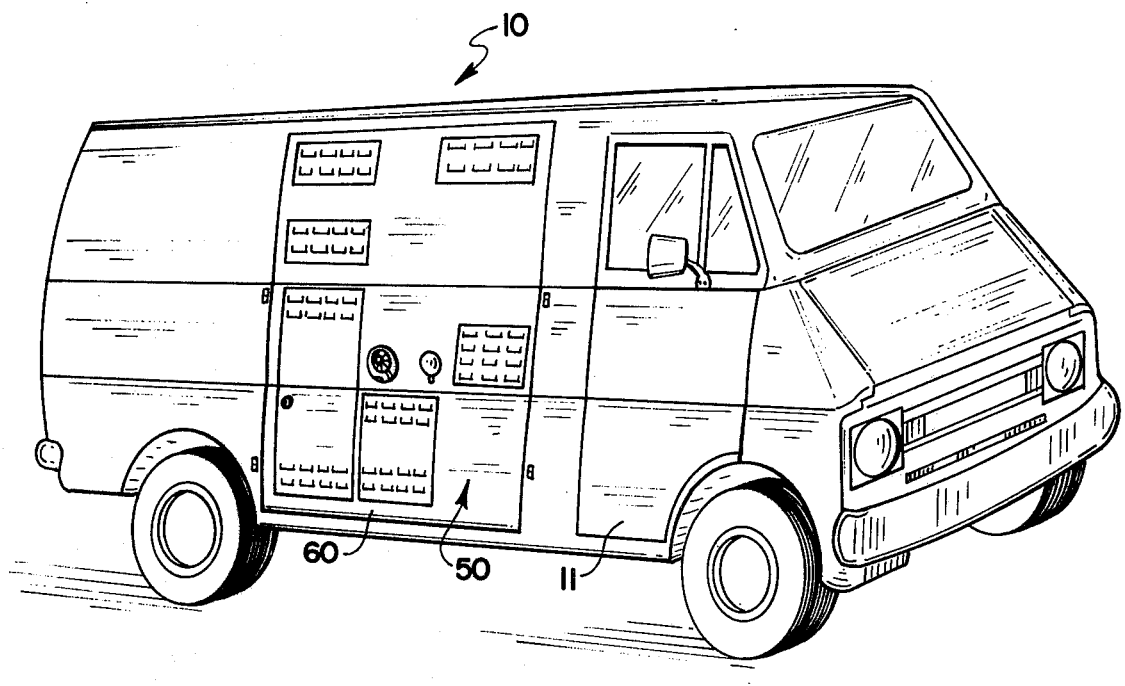
FIG. 1 is a perspective view of a van vehicle outfitted with the utility unit of this invention.

DESCRIPTION OF PREFERRED EMBODIMENTS (i) Description of FIG. 1

Referring now to FIG. 1, a van 10 is shown. The usual van construction includes rear loading doors (not shown), or side loading doors and driver and passenger entry doors 11. The side doors may be of the hinge type or may be of the sliding type. The utility unit 50 of an embodiment of this invention is intended to replace either the rear or the side doors; as shown in FIG. 1 it replaces a side loading door, by a surrogate door panel 60 which is part of the utility unit to be described hereinafter with reference to FIGS. 2 and 3. Thus, the unit replaces an exterior door at a corresponding door frame portion on the van or vehicle, and the surrogate door panel, which is an exterior panel, is correspondingly sized and shaped to conform substantially to the conformation of the door being replaced and in turn to be positioned at and to occupy substantially the same space normally occupied by the replaced door, whereby to maintain the normal vehicle silhouette or outline, with the remainder of the unit being positioned internally within the vehicle. When the utility unit 50 is removed from the van, the original van door is replaced on the van.

Figure 2:
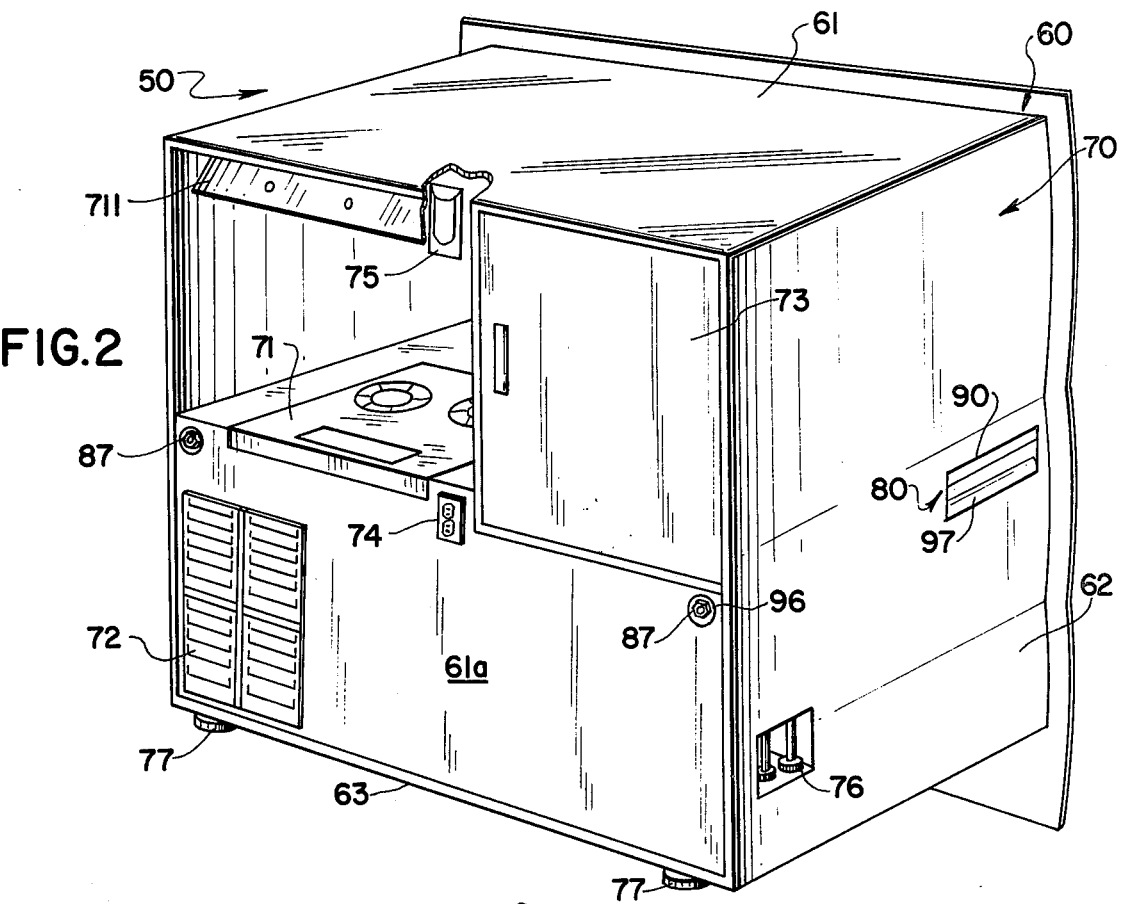
FIG. 2 is a perspective view of the front inside of the utility unit of this invention.
Figure 3:
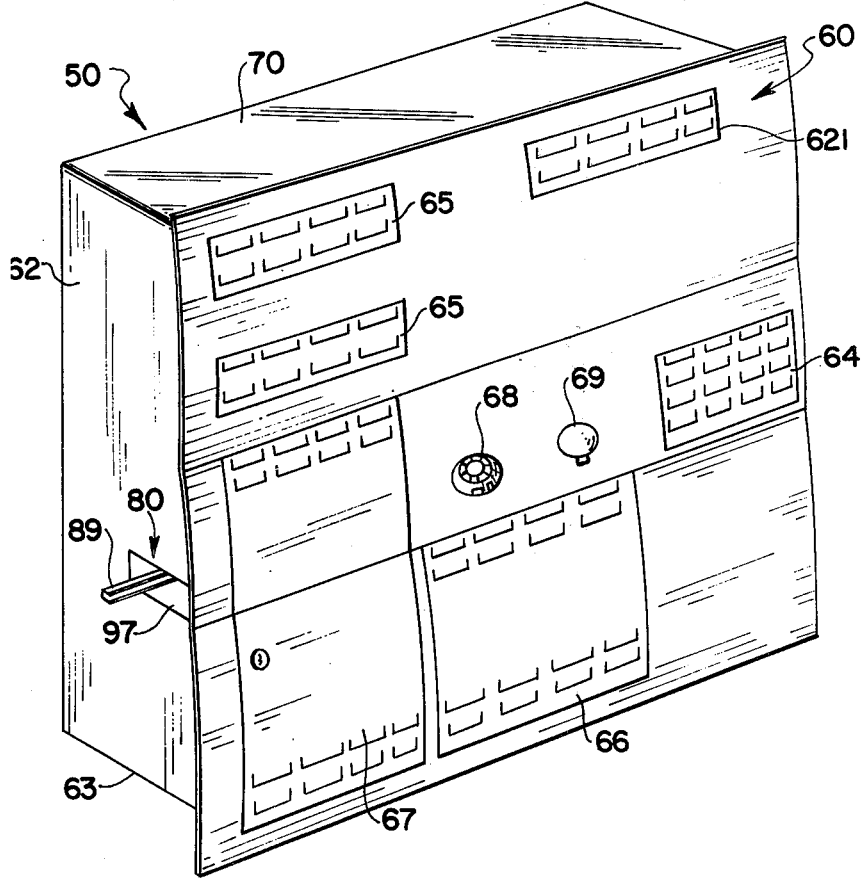
FIG. 3 is a perspective view of the rear outside of the utility unit of this invention.

(ii) Description of FIGS. 2 and 3

FIGS. 2 and 3 show details of the utility unit 50 of one embodiment of this invention. The utility unit 50 is made up of two basic components, the exterior surrogate door panel 60, and the utility module interior 70. The utility module 70 as shown in FIGS. 2 and 3 includes an enclosure having an interior facade 61a, top 61, sides 62 and base 63, within which are stove 71, furnace 72, refrigerator 73, electrical outlets 74, gas light 75, water heater (not shown) and water hook-up hoses 76. In addition an exhaust hood 711 is provided for disposing of cooking odors. Surrogate door panel 60 which is secured to the rear of utility module 70 is provided with suitable venting, namely 64 for the furnace 72, 621 from the exhaust hood 711, 65 for the refrigerator 73, and 66 for the water heater in the utility module 50. In addition surrogate door panel 60 includes access panel 67 to a cabinet for a propane bottle, as well as an electrical supply plug 69 and water supply filler plug 68. It is understood that while the embodiment of the invention which is shown in FIGS. 2 and 3 includes a particular grouping of appliances, the scope of the invention could include any combination of appliances in varying configurations, e.g. air conditioning units, microwave ovens, etc.

Figure 4:
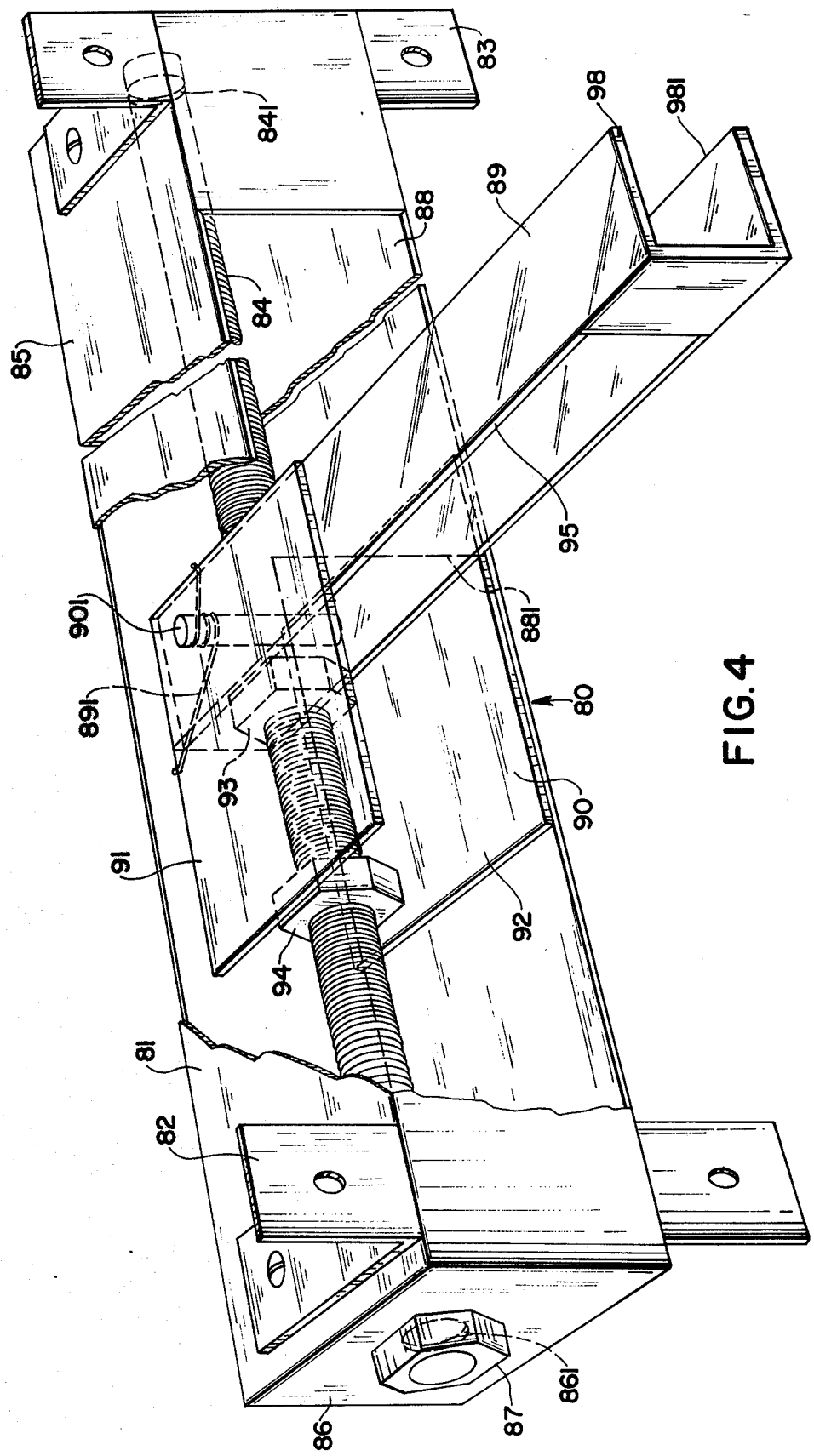
FIG. 4 is a perspective view of the clamping member of this invention.

The utility unit 50, including the surrogate door panel 60, is intended to replace removably the original van door. In order to install the utility unit 50, the original van door is removed, and is replaced by the utility unit 50, with the utility module 70 disposed within the van and the original van door now replaced by surrogate door panel 60. In order to secure removably the utility unit 50 in place, clamping means 80, partially shown in FIGS. 2 and 3 and to be described hereinafter in greater detail in FIG. 4 are used. The utility unit is provided with height adjusting legs 77 depending from base 63 which permit the utility unit 50 to be supported on the van floor and to be levelled and stabilized inside the van.

In a preferred embodiment of the present invention surrogate door panels 60 are made of fiberglass in order to facilitate manufacture and to provide well fitting surrogate door panels.

Another embodiment of the present invention makes use of spare parts door units which can be obtained directly from the vehicle manufacturer and which can be machined and outfitted with the desired features.

In order to secure the utility unit 50 to the van, the original hinged or door mountings of the van may be used. However, in a preferred embodiment of the present invention, a securing clamp 80 as shown in FIG. 4, is used which permits easy mounting and securement as well as dismounting of the unit, with a minimum of adjustments and fittings necessary.

(iii) Description of FIG. 4

As shown in FIG. 4, the clamping unit 80 includes a hollow rectangular parallelpiped housing 81, and securement 82, 83 transversely positioned at opposite ends thereof for securing the clamping unit 80 to the inside of utility module 70. While securement plates 82, 83 have been shown at the ends, it is possible to include additional intermediate securement plates. Disposed within the housing 81 and mounted longitudinally thereof is screw member 84 which is freely rotatably mounted in aperture 841 at one end 85 of housing 81 and projecting through aperture 861 in the other end 86 of housing 81 and which is there fitted with an adjusting nut 87. Approximately half way down the length of screw member 84 and protruding out through slot 88 of housing 81 is pivoting arm 89 which is pivotally interconnected to one end of travelling rail 90 by pin 901. Rail 90 includes plates 91, 92 each secured at one end to nuts 93, 94 which in turn are threaded about screw member 84. Thus, pivoting arm 89 is connected to travelling rail 90 by pin 901, which permits pivoting arm 89 to be retracted into the housing 81 to permit installation of the unit and to swing transversely out through slot 88 as a result of rotation of screw member 84. The extent of the swinging motion of pivoting arm 89 is limited by engagement of the front faces 95 of arm 89 with the trailing edge 881 of slot 88 in housing 81. Pivoting arm 89 is urged to the extended position by spring means 891.

Securing clamp 80 is mounted on the inside of utility module 70 in close proximity to surrogate door panel 60, and one such clamp 80 is attached to the inside of each side wall 62 of utility module 70 by securement plates 82, 83 through conventional fastening means, such as, for example, screws or rivets. Housing 81 of securing clamp 80 is of suitable length to reach the facade 61a, but not to allow adjusting nut 87 to protrude beyond the facade 61a of utility module 70. An aperture 96 is provided on the facade 61a for access to the adjusting nut 87. The side walls 62 of the utility moduel 70 are each provided with a slot 97 which allow pivoting arm 89 to protrude outwardly from within the utility module 70.

Rotation of adjusting nut 87 causes screw 84 to rotate, which in turn causes travelling rail 90 to travel longitudinally along the housing 81. As the rail 90 moves, pivoting arm 89, which protrudes outside the modular unit 70, is urged to pivot. The outer end 98 of pivoting arm 89 thus swings forward in an arc as it is urged by the movement of screw 84 which is in turn controlled by rotation of adjusting nut 87. Pivoting arm 89 will arc until it abuts nut 93, at a position approximately perpendicular with housing 81.

Further rotation of adjusting nut 87, will cause pivoting arm to travel through the aperture 96 in approximately the same perpendicular manner. Thus, pivoting arm 87 may be urged against the door frame of the vehicle, as will be described hereafter.

Operation of Preferred Embodiments

When the utility unit 70 is mounted in the van, the end 98 of pivoting arm 87 is braced against the inside frame members (not shown) of the van doorway. Tightening of adjusting nut 87 forcingly urges pivoting arm 89 against the inside frame members to the van doorway. Thus, the entire utility unit 70 is secured within the doorway, and is retained in this position by tightening of adjusting nut 87, which in turn effectively braces the pivoting arms 89 against the frame of the van.

Summary

In this manner, a utility unit 70 which contains appliances is provided. The utility unit 70 can be easily mounted in a van in lieu of the original van doors, and is provided with securement means for providing a universal mounting in the van and which is simple to install. Moreover, the utility unit 70 can just as easily be removed, and the original door or doors replaced.

Accordingly, the modular utility unit 50 is intended to replace removably an exterior door, e.g. at a corresponding door frame portion, on a vehicle, and constitutes an inherently self-contained modular utility unit having an interior utility module 70, including an interior facade, base, top and sides, and an exterior surrogate door panel 60, in which the panel is corespondingly sized and shaped to conform substantially to the conformation of the door being replaced and in turn to be positioned at and to occupy substantially the same space normally occupied by the door with the utility module, e.g. facade, base, top and sides, being positioned within the vehicle and adapted to accommodate utility-components and utility appliances thereat, e.g. with corresponding external venting means and external supply connection means being provided on the panel for servicing such utility-components and utility-appliances, and further having releasable securing means for removably securing the unit within the vehicle, e.g. with such securing means including a housing mounted on the unit in proximity to the panel and operatively carrying an engagement arm adjustably movable from a retracted position with respect to the housing to an extended position with respect thereto for removable securing engagement with an adjacent portion of the vehicle, plus means for adjustably moving the arm between such retracted and extended positions.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A modular utility unit intended to replace removably an exterior door at a corresponding door frame portion on a vehicle, said utility unit comprising: a modular, utility-component and appliance-containing, unit having an interior facade, a base, a top, sides and an exterior surrogate door panel, the surrogate door panel being correspondingly sized and shaped to conform substantially to the conformation of the door being replaced and in turn to be positioned at and to occupy substantially the same space normally occupied by the door with the remainder of the unit being positioned within the vehicle, utility appliances disposed within said modular utility unit in proximity to said surrogate door panel, and clamping means cooperating with the corresponding door frame portion of said vehicle for removably securing said modular utility unit within said vehicle.

2. The modular utility unit of claim 1, wherein said utility-components comprise units requiring external venting.

3. The modular utility unit of claim 2, wherein said appliances comprise a range, a refrigerator, a heater, a gas light, a water heater, an exhaust shroud, a supply of fuel, water hook-up hoses and electrical outlets.

4. The modular utility unit of claim 3 wherein said surrogate door panel is provided with venting outlets for at least said appliances and said utility-components, and with supply plugs for said water and electrical outlets.

5. The modular utility unit of claim 2, wherein said clamping means comprises a hollow housing having a slot on one side thereof, provided with securement means on said housing for mounting said housing within said modular utility unit in proximity to said surrogate door panel; a rotatable screw member mounted longitudinally therein, adjusting means secured to one end of said rotatable screw member; a travelling rail member disposed along said screw member; and a pivotable arm supported by said travelling rail member, said pivoting arm protruding from said slot and being adapted to pivot as a result of rotation of said rotatable screw member, thereby clamping said unit within said vehicle when said adjusting means causes said screw member to rotate in a predetermined direction.

6. The modular utility unit of claim 5, wherein said clamping means comprises a hollow rectangular parallelpiped housing having a slot in one side thereof, and provided with securement plates transversely positioned at opposite ends thereof for mounting said housing within said modular utility unit in proximity to said surrogate door panel; a screw member mounted longitudinally therein, one end of said screw member being freely rotatably mounted at one end of said housing, and the other end of said screw member being provided with an attached adjusting means and a travelling rail member disposed along said screw member; and a pivotable and arm supported by said rail member, said pivotable arm being adapted to protrude from said slot and to pivot as a result of rotation of said screw member.

7. A clamping means comprising; a hollow housing having a slot on one side thereof and provided with securement means on said housing; a rotatable screw member mounted longitudinally therein; adjusting means secured to one end of said rotatable screw member; a travelling rail member disposed along said screw member; and a pivotable arm supported by said travelling rail member, said pivotable arm being adapted to protrude from said slot and being adapted to pivot as a result of rotation of said rotatable screw member.

8. The clamping means of claim 7 wherein the clamping means comprises a hollow rectangular parallelpiped housing having a slot on one side thereof;
   a screw member mounted longitudinally therein, one end of the screw member being freely rotatably mounted to one end of the housing, and the other end of the screw member being provided with an attached adjusting means including adjusting nut; a travelling rail member disposed along the screw member; and a pivotable arm supported by the rail member, the pivotable arm being adapted to protrude from the slot to pivot as a result of rotation of the adjusting nut of the adjusting means.

9. A modular utility unit intended to replace removably an exterior door on a vehicle, comprising a self-contained modular utility unit having an interior utility module and an exterior surrogate door panel, the panel being correspondingly sized and shaped to conform substantially to the conformation of the door being replaced and in turn to be positioned at and to occupy substantially the same space normally occupied by the door with the utility module being positioned within the vehicle and adapted to accommodate utility-components and utility-appliances thereat, corresponding external venting means and external supply connection means provided on said panel for such utility-components and utility-appliances, and releasable securing means for removably securing the unit within said vehicle.

10. The modular utility unit of claim 9 wherein the securing means include a housing mounted on the unit in proximity to the panel and operatively carrying an engagement arm adjustably movable between a retracted position and an extended position with respect to the housing for removable securing engagement with an adjacent portion of the vehicle, and means for adjustably moving the arm between such retracted and extended positions.

* * * * *